No. 675,241. Patented May 28, 1901.
J. PEDERSEN.
ADJUSTABLE BEARING.
(Application filed Sept. 17, 1900.)
(No Model.)

Witnesses:
G. S. Noble
T. W. McMahon

Inventor.
Johannes Pedersen
by B. Singer Att'y

UNITED STATES PATENT OFFICE.

JOHANNES PEDERSEN, OF COPENHAGEN, DENMARK.

ADJUSTABLE BEARING.

SPECIFICATION forming part of Letters Patent No. 675,241, dated May 28, 1901.

Application filed September 17, 1900. Serial No. 30,338. (No model.)

*To all whom it may concern:*

Be it known that I, JOHANNES PEDERSEN, a citizen of Denmark, residing at Copenhagen, Denmark, have invented certain new and useful Improvements in Adjustable Bearings for Shafts and Spindles or Like Purposes, of which the following is a specification.

It is a well-known fact that the steady and silent motion of a rotating shaft depends on the straight and correct position of the bearings. An ordinary bearing which has become too large through wear is useless and difficult to repair, so that in most cases it has to be replaced by a new one. This involves not only delay, but also considerable expense.

The invention herein described refers to a bearing or bush, the wearing or contact parts of which are adjustable in such a manner that shafts of small and large diameters can be used. Therefore this kind of bush can be readjusted after it has been worn to a comparatively larger bearing-surface or when the shaft has by wear become smaller. A further advantage is that these bushes diminish the circular friction to the greatest possible extent, as they offer flat surfaces to the shaft, touching same only in certain places; but they can be formed arched on their outside. Each of the bushes is placed in the case or box of the bearing in such a way that no other wedges or fastenings are required.

I will now describe my invention with reference to the accompanying drawings.

Figure 1:
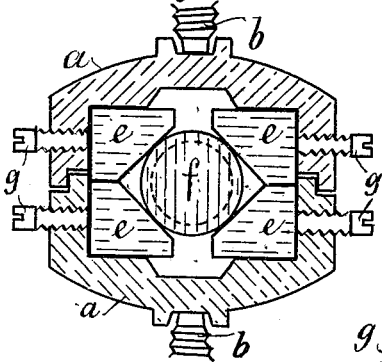
Figure 2:
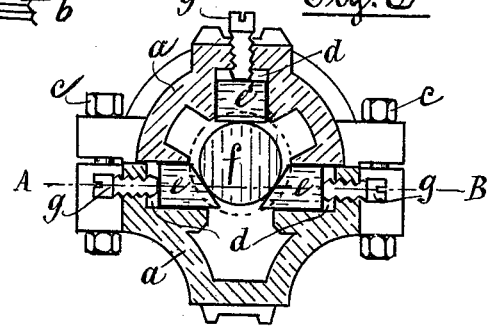
Figure 3:
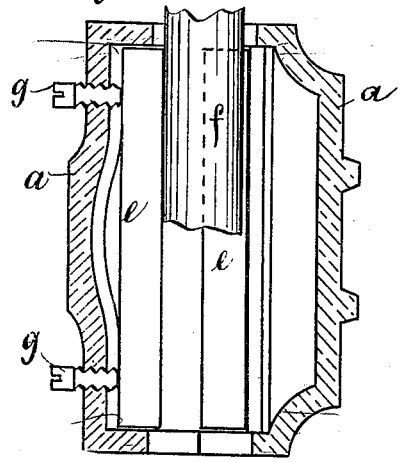
Figure 4:
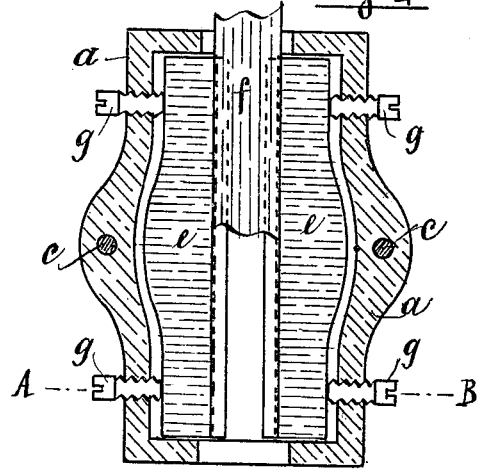

Figure 1 is a vertical cross-section through a bearing embodying my invention. Fig. 2 is a like section through a modification thereof. Fig. 3 is a longitudinal section taken through Fig. 2 immediately above the sliding blocks $e$ thereof, and Fig. 4 is a like section taken upon the line A B of said figure.

The box or case $a$ consists of two parts—an upper and a lower part—which can be fastened together either by thumb-screws, as shown by $b$, Fig. 1, or by bolts $c$, Fig. 2. This box $a$ has inside movable bushes $e$, which are placed in recesses $d$. These sliding blocks or bushes $b$, as represented in Fig. 1, are four in number and beveled upon the faces contacting with the shaft F, so that the lower pair pass beneath the shaft and serve to support it, while the upper pair pass over it and serve to hold it down. Their position can be adjusted by set-screws $g$ to accommodate longer or smaller shafts and to take up wear. In the modification shown in Fig. 2 the lower pair of beveled bushes are retained, but the upper pair are replaced by a rectangular sliding block $e'$, pressed down by set-screws $g$ against the perpendicular diameter of the shaft.

As the bushes present very flat surfaces to the shafts the least possible circular friction is insured and the shaft is able to glide more freely, especially as each of the bushes is adjustable in its place and no wedges are required.

Having now particularly described and ascertained the nature of my said invention and in what manner the same is to be performed, I declare that what I claim is—

1. An adjustable bearing for shafts, comprising a pair of slidable blocks or bushes beveled on their faces contacting with the shaft, and adjusted in therebeneath, and adjustable means pressing upon the upper periphery of the shaft to hold it against the beveled faces of said blocks.

2. An adjustable bearing for shafts comprising two pairs of slidable blocks, beveled on their faces contacting with said shaft and one pair closing in beneath the shaft while the other pair closes thereover.

In testimony whereof I affix my signature in presence of two witnesses.

JOHANNES PEDERSEN.

Witnesses:
HANS PEDERSEN,
J. C. JACOBSEN.